United States Patent
Kremer

(10) Patent No.: US 6,732,996 B1
(45) Date of Patent: May 11, 2004

(54) GAS CYLINDER VALVE

(75) Inventor: Paul Kremer, Walferdange (LU)

(73) Assignee: Ceodeux Ultra Pure Equipment Technology S.A., Lintgen (LU)

(*) Notice: Subject to any disclaimer, the term of this patent is extended or adjusted under 35 U.S.C. 154(b) by 0 days.

(21) Appl. No.: 09/914,748

(22) PCT Filed: Feb. 24, 2000

(86) PCT No.: PCT/EP00/01513

§ 371 (c)(1),
(2), (4) Date: Sep. 4, 2001

(87) PCT Pub. No.: WO00/53962

PCT Pub. Date: Sep. 14, 2000

(30) Foreign Application Priority Data

Mar. 5, 1999 (LU) .................................................. 90367

(51) Int. Cl.⁷ .............................................. F16K 39/00
(52) U.S. Cl. ............................. 251/14; 251/24; 251/58; 251/282
(58) Field of Search ............................. 257/24, 14, 58, 257/282

(56) References Cited

U.S. PATENT DOCUMENTS

| | | | | |
|---|---|---|---|---|
| 3,520,510 A | * | 7/1970 | Slawinski et al. | 251/24 |
| 3,586,287 A | * | 6/1971 | Knobel | 251/24 |
| 4,257,450 A | * | 3/1981 | Ollivier | 251/368 |
| 4,479,520 A | * | 10/1984 | Holben | 251/900 |
| 5,285,998 A | * | 2/1994 | Zink et al. | 251/335.3 |
| 5,472,015 A | * | 12/1995 | Chiou | 251/63.5 |
| 5,553,635 A | * | 9/1996 | Gregoire | 251/282 |
| 5,673,897 A | * | 10/1997 | Crochet et al. | 251/335.3 |
| 5,785,082 A | * | 7/1998 | Geis et al. | 251/148 |
| 5,836,568 A | * | 11/1998 | Ishigaki et al. | 251/148 |
| 5,863,023 A | * | 1/1999 | Evans et al. | 251/63.5 |

FOREIGN PATENT DOCUMENTS

DE 859 583 * 12/1952

* cited by examiner

Primary Examiner—John Bastianelli
(74) Attorney, Agent, or Firm—Andrus, Sceales, Starke & Sawall, LLP

(57) ABSTRACT

A gas cylinder valve comprises a valve body (10) having a valve chamber (30), an inlet passage (28) and an outlet passage (34) therein. An obturating body (38) is movable relative to a valve seat (40) in the valve body. A valve stem (48) is connected to the obturating body for moving the latter between a closed position, wherein the obturating body sits on the valve seat so as to seal gas discharge through the valve seat, and an open position, wherein the obturating body is spaced from the valve seat so as to allow gas discharge from the gas cylinder through the valve seat. A first diaphragm member (50) forms a flexible wall of the valve chamber. It is mechanically connected to the valve stem, so that a reciprocating movement of the valve stem elastically deforms the first diaphragm member. The inlet passage is in direct pressure communication with the valve chamber, so that the valve chamber is under gas cylinder pressure when the valve is closed. The valve seat is located between the valve chamber and the outlet passage. The obturating body is arranged in the direction of the discharged gas downstream of the valve seat, so that the gas cylinder pressure in the valve chamber acting on the first diaphragm member tends to pull the obturating body onto its valve seat.

24 Claims, 3 Drawing Sheets

GAS CYLINDER VALVE

CROSS REFERENCE TO RELATED APPLICATION

The present application is the U.S. national stage application of International Application PCT/EP00/01513, filed Feb. 24, 2000, which international application was published on Sep. 14, 2000 as International Publication WO 00/53962 in the English language. The International Application claims priority of Luxembourg Patent Application 90367, filed Mar. 5, 1999.

FIELD OF THE INVENTION

The present invention relates to a gas cylinder valve and more particularly to a gas cylinder valve with a diaphragm member for use with high and ultra high purity gases.

BACKGROUND OF THE INVENTION

Gas cylinder valves are used to seal and to control the discharge of gas from gas cylinders. In some applications, the gas dispensed from the gas cylinder must remain free of impurities. This is especially true in the semiconductor industry where any impurities in the gas can adversely affect the electrical properties of the device and can greatly decrease the manufacturing yield. Most often these gases are also very corrosive and toxic.

Commonly, the valves used for high purity, ultra high purity and/or highly corrosive or toxic gases are diaphragm valves. Such diaphragm valves are e.g. disclosed in U.S. Pat. Nos. 5,516,078 or 5,823,509. They include a valve body having a valve chamber, an inlet passage and an outlet passage therein. The inlet passage communicates via a seat with the valve chamber. An obturating body is arranged in the valve chamber and is movable relative to the valve seat. A valve stem is connected to the obturating body for moving the latter between a closed position, wherein the obturating body sits on its valve seat so as to seal gas discharge through the valve, and an open position, wherein the obturating body is spaced from the valve seat so as to allow gas discharge from the gas cylinder through the valve seat. A diaphragm member forms a flexible wall of the valve chamber opposite the valve seat. It forms a sealing separation between the valve chamber and a stem chamber in which the valve stem is housed. The valve stem, the obturating body and the diaphragm member are fused together, so that a reciprocating movement of the valve stem elastically deforms the diaphragm member.

It will be noted that the outlet passage of the above valves is in direct communication with the valve chamber, so that ambient air humidity may enter the latter when the valve is closed. This air humidity may condense in the valve chamber. If a corrosive gas is then discharged through the valve chamber, the condensate accumulated therein will inevitably form strong acids in the valve chamber. These strong acids might attack for example the diaphragm member in the valve chamber.

It will also be noted that the above valves are usually used with gas cylinders under high pressure. It follows that high closing forces are required for maintaining the obturating body in a sealed position on its seat and to open it.

DE-A-859,583 discloses a gas valve designed for flow control functions requiring a low-setting control. It includes a valve housing having a valve chamber, an inlet passage and an outlet passage communicating with the valve chamber. A valve disk is biased by a closing spring onto a first valve seat, which is located between the valve chamber and the outlet passage. The valve chamber is consequently under gas pressure when the valve is closed. A valve body is located in the valve chamber and associated therein with a second valve seat. An axial bore connects the first valve seat to the second valve seat. The valve body is loosely connected to the valve disk via a hollow valve shaft extending through the axial bore, so that it is axially spaced from the second seat when the valve disk sits on the first seat. A metal membrane forms a gastight separation wall between the valve chamber and an outer actuating shaft. The latter is capable of axially pushing via the membrane onto the valve body. In a first step, the actuating shaft pushes the valve disk via the valve body and the hollow valve shaft axially away from the first valve seat. Over the second valve seat a high gas flow establishes into the hollow shaft and then over the first valve seat in to the outlet passage. In a second step the actuating shaft pushes the valve body onto the second valve seat. Now a reduced gas flow establishes through a flow restricting nozzle in the valve body into the hollow shaft and then over the first valve seat in to the outlet passage. When the actuating shaft does not axially push via the membrane onto the valve body, then the closing spring pushes the valve disk onto the first valve seat and closes the valve. It will be noted that when the valve is closed, the closing spring has to warrant that gas pressure acting onto the valve disk seated on the first valve seat does not open the valve.

OBJECT OF THE INVENTION

There is a need for an improved gas cylinder valve in which the diaphragm member is better protected against corrosion and which requires lower closing forces to maintain the obturating body in a sealed position on its seat and to open it.

SUMMARY OF THE INVENTION

A gas cylinder valve in accordance with the invention comprises a valve body having a valve chamber, an inlet passage and an outlet passage therein. The inlet passage and the outlet passage communicate with the valve chamber. An obturating body is movable relative to a valve seat in the valve body. A valve stem is connected to the obturating body for moving the latter between a closed position, wherein the obturating body sits on the valve seat so as to seal gas discharge through the valve seat, and an open position, wherein the obturating body is spaced from the valve seat so as to allow gas discharge from the gas cylinder through the valve seat. A first diaphragm member forms a flexible wall of the valve chamber. This first diaphragm member is mechanically connected to the valve stem, so that a reciprocating movement of the valve stem elastically deforms the first diaphragm member. In accordance with an important aspect of the invention, the valve seat is located between the valve chamber and the outlet passage. The inlet passage is in direct pressure communication with the valve chamber, so that the valve chamber is under gas cylinder pressure when the valve is closed. The obturating body is arranged, in the direction of the discharged gas, downstream of the valve seat, so that the gas cylinder pressure acting on the first diaphragm member in the valve chamber tends to pull the obturating body on its valve seat. It will first be appreciated that—when the valve is closed—the valve chamber containing the first diaphragm member is sealed by the obturating body relative to the outlet connection. It follows that ambient air humidity cannot enter into the valve chamber an condense on the first diaphragm member. It will further be appreciated that—when the valve is closed—the valve chamber containing the first diaphragm member is in pressure communication with the interior of the gas cylinder. It follows that the gas cylinder pressure acts on the first diaphragm member and contributes to the closing force maintaining the obturating body on its seat.

In a preferred embodiment the cross-section sealed in the valve chamber by the first diaphragm member is bigger than the cross-section sealed by the obturating body sitting on its seat. It follows that—when the valve is closed—a positive pressure force will press the obturating body on its seat.

A preferred embodiment of the valve has furthermore one ore more of the following features. The stem extends axially through the first diaphragm member, wherein a gas tight weld advantageously provides a gasproof connection between the stem and the first diaphragm member. The valve body has a stem chamber with a shoulder therein, wherein the first diaphragm member lies with its outer edge on the shoulder and is advantageously connected thereto by means of a gasproof weld. The valve may further include a second diaphragm member axially spaced from the first diaphragm member in the stem chamber. In this case, a channel in the valve body will advantageously allow to create a partial vacuum in the stem chamber between the first and second diaphragm member, so as to be able to check whether the latter still provide the required gas tightness.

The valve has advantageously a sealing cap with an integrated locking device for pushing the obturating body firmly against its seat, when the sealing cap is put onto the outlet connection.

The outlet passage is advantageously housed in an outlet connection that is removably fixed to the valve body.

In a preferred embodiment, the valve further includes an linear actuator. This linear actuator is then advantageously mounted on the valve body and connected to the valve stem by means of a lever mechanism. The latter is preferably mounted outside of the valve body laterally thereof. It includes for example a lever arm connected by means of an articulation to an actuating rod of the actuator, and an intermediate articulation for the lever arm on the valve body. This lever arm has a free end bearing against a bearing surface on a tip of the valve stem, so as to be able to push the valve stem into the valve body.

A preferred embodiment of the valve body includes: a flange for mounting the valve on a gas cylinder; a relatively thin neck having most of the inlet passage therein; and a first transverse body supported by the relatively thin neck. The first transverse body has the valve chamber and the seat and the outlet passage therein. It is housing the obturating body, the valve stem and the first diaphragm member; wherein the axis of motion of the stem is transverse to the relatively thin neck. The valve body may further include a second transverse body supported on the first transverse body. This second transverse body then houses a linear actuator, as for example a pneumatic cylinder, wherein the axis of motion of the linear actuator too is transverse to the relatively thin neck.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

The valve shown in the Figures is a gas cylinder valve particularly suited for use with ultra pure, very corrosive and high pressure gases.

Figure 1:
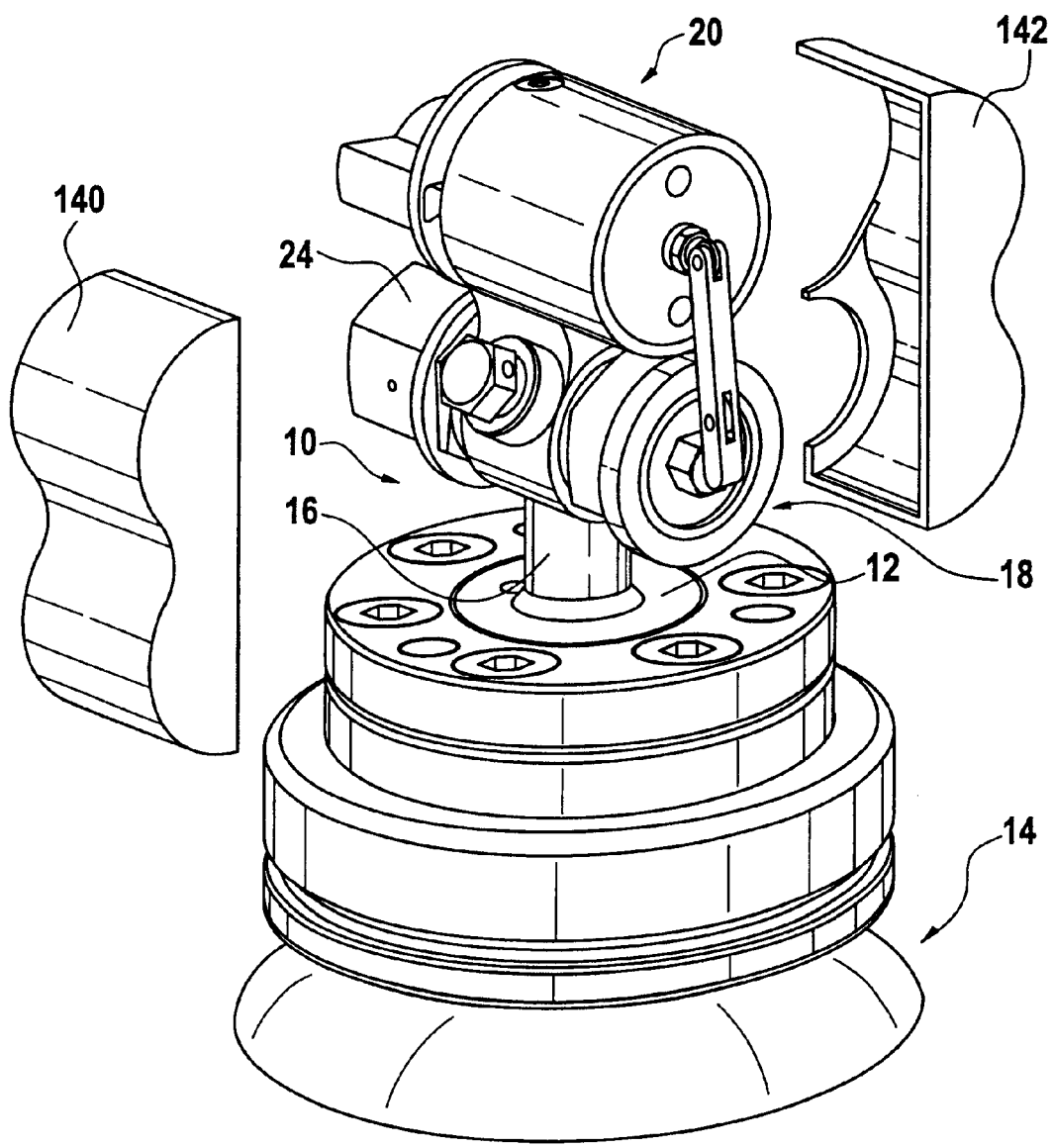
FIG. 1: is a three dimensional representation of a gas cylinder valve in accordance with the invention.
Figure 2:
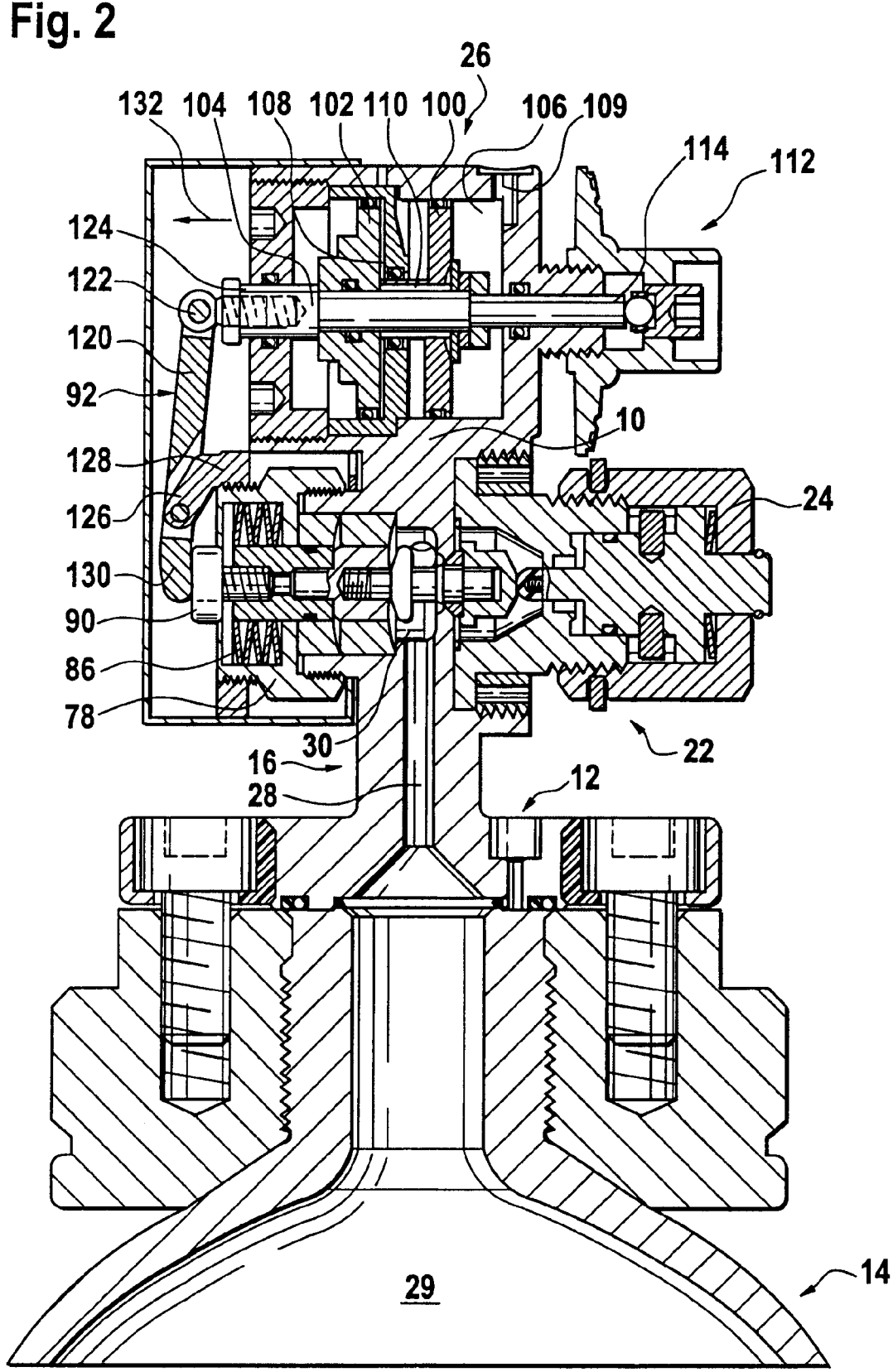
FIG. 2: is a longitudinal section through the valve of FIG. 1.

Referring simultaneously to FIGS. 1 and 2, it will be noted that the valve includes a valve body 10 comprising a flange 12, to be secured to a high pressure gas cylinder 14, a relatively thin and long neck portion 16 projecting upwardly from the flange 12, a first transverse body 18 supported by the neck portion 16, and a second transverse body 20 supported on the first transverse body 18. The first transverse body 18 houses the valve assembly as such. It has a standardised outlet connection 22 for connecting a gas conduit thereto (not shown). In the Figures this outlet connection 22 is closed by a sealing cap 24. The second transverse body 20 houses a pneumatic cylinder 26 for actuating the valve. It will be noted that the relatively long and thin neck 16 is an important safety feature of the valve. As it is far less rigid than a massive valve body, it will most often deform instead of break, when the gas cylinder is for example involved in an accident during transport.

As seen on FIG. 2, an inlet passage 28 is arranged in the neck portion 16. When the valve is mounted on the gas cylinder 14, the lower end of this inlet passage 28 debouches into the interior 29 of the gas cylinder 14. The upper end of the inlet passage 28 debouches into a valve chamber 30, which is located in the first transverse body 18.

Figure 3:
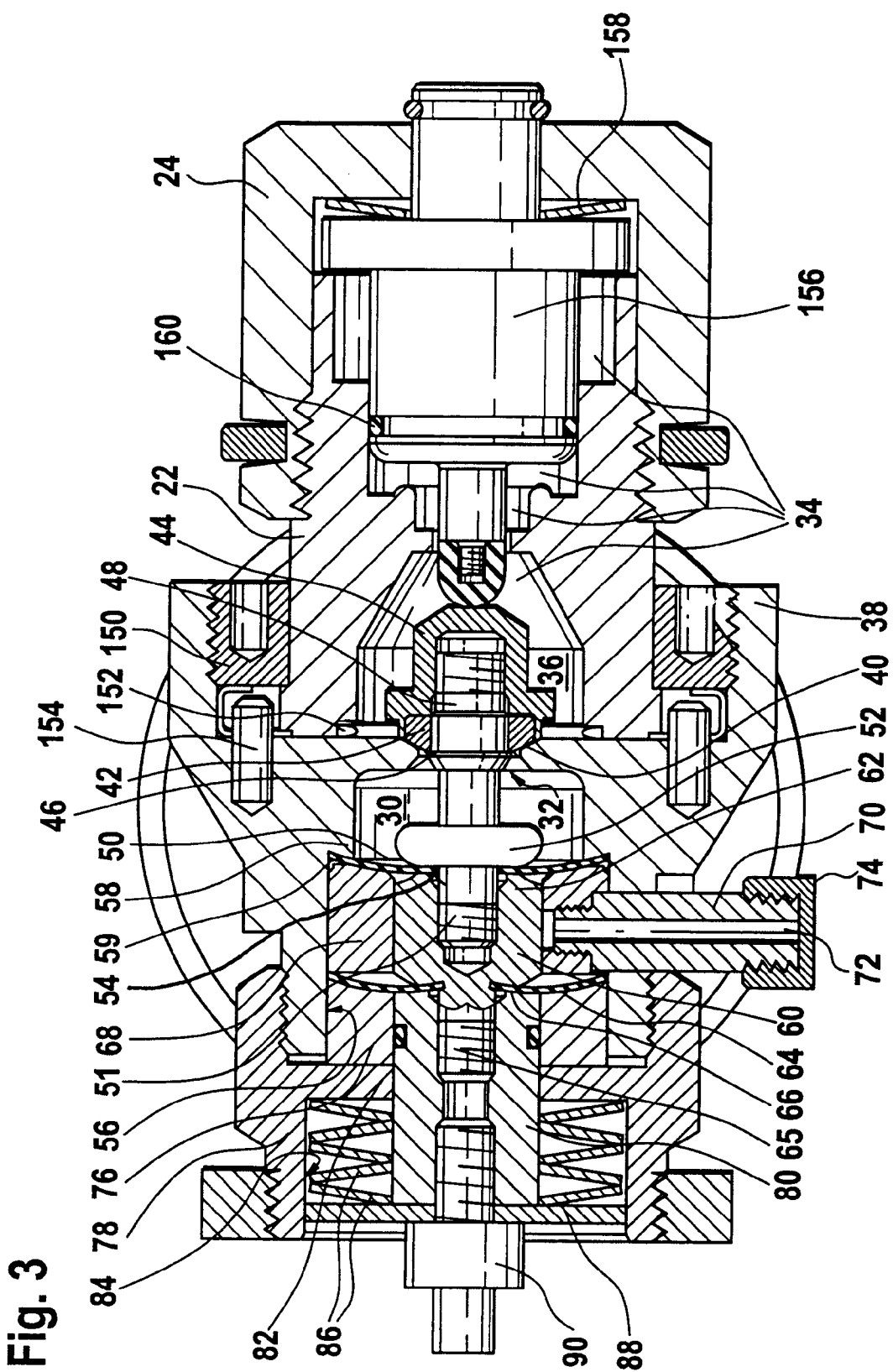
FIG. 3: is a transverse section through the valve of FIG. 1.

Referring now to FIG. 3, the valve assembly as such will be described in detail. The valve chamber 30 communicates via an seat opening 32 into an outlet passage 34. The latter is arranged in the outlet connection 22. This outlet passage 34 forms a chamber 36 immediately downstream of the seat opening 32. An obturating body 38 is housed in this chamber 36. In FIG. 3 the obturating body 38 sits on a seat 40, surrounding the seat opening 32 in the chamber 36. In this position of the obturating body 38 the valve chamber 30 is sealed with regard to the outlet passage 34. It follows that, on the one hand, no gas can be discharged through the valve and, on the other hand, no ambient air humidity can enter the valve chamber 30.

The obturating body 38 includes a soft seal ring 42, which is fixed between a cap 44 and a shoulder 46 of a first stem part 48. The latter extends axially through the seat opening 32 and the valve chamber 30. Its cross-section is smaller than the cross-section of the seat opening 32, so that the obturating body can be lifted from its seat 40 by pushing the stem part 48 axially through the seat opening 32 into the chamber 36, wherein an annular gas passage is formed in the seat opening 32 around the stem part 48. Through this annular opening the gas can discharge from the valve chamber 30 into the outlet passage 34.

A first diaphragm member 50 consisting preferably of a set of sandwiched metallic diaphragms (not shown) forms a flexible wall of the valve chamber 30 axially opposite of the seat opening 32. The number of sandwiched diaphragms forming the diaphragm member 50 will vary as a function of the valve size, choice of materials, design pressure and other factors. The material of the diaphragms will be chosen so as to warrant an elastic and fatigue behaviour, and if the valve is used for high corrosive gases, an excellent resistance to corrosion. A suitable material could e.g. be a nickel, molybdenum and chromium alloy.

A shaft 51 of the first stem part 48 extends through a central hole of the first diaphragm member 50. The inner edge of the diaphragm member 50 lies on a shoulder which is formed in the valve chamber 30 by a bourrelet 52 of the first stem part 48. A circumferential weld 54 connects the diaphragm member 50 to the first stem part 48 in a gasproof manner.

A stem chamber 56 is located on the other side of the first diaphragm member 50. The stem chamber 56 has a bigger cross-section than the valve chamber 30, so that a shoulder 58 is formed at the transition from the stem chamber 56 and the valve chamber 30. The first diaphragm member 50 lies with its outer edge on the shoulder 58. A circumferential weld 59 connects the outer edge of the diaphragm member 50 to the shoulder 58 in a gasproof manner. It follows that the diaphragm member 50 separates the valve chamber 30 in a gasproof manner from the stem chamber 56.

As the first stem part 48 and the first diaphragm member 50 are rigidly connected together, a reciprocating movement of the first stem part 48 elastically deforms the first diaphragm member 50. In FIG. 3 the obturating body 38 is abutting on its seat 40. Viewed from the valve chamber 30, the first diaphragm member 50 has a concave surface curvature. If the first stem part 48 is moved to the right to lift the obturating body 38 from its seat 40 (i.e. for opening the valve), the concave surface curvature of the first diaphragm member 50 will gradually decrease. It will be noted that the maximum opening stroke of the first stem part 48 and the initial concave surface curvature of the first diaphragm member 50 are chosen so that the first diaphragm member 50 maintains a residual concave surface curvature for the maximum opening stroke of the first stem part 48.

As the inlet passage 28 is in direct pressure communication with the valve chamber 30, the valve chamber 30 is under gas cylinder pressure when the valve is closed, i.e. when the obturating body 38 is on its seat 40. It will be appreciated that the pressure in the gas chamber 30 produces a closing force (i.e. a force pulling the obturating body 38 on its seat 40) that is proportional to the difference between the cross-section sealed by the first diaphragm member 50 and the cross-section sealed by the obturating body 38 sitting on its seat 40. As the cross-section sealed by the first diaphragm member 50 is generally much bigger than the cross-section sealed by the obturating body 38 sitting on its seat 40, it follows that the gas cylinder pressure generates an important force maintaining the obturating body 38 in the closed position on its seat 40.

A second stem part 60 is fixed on the shaft 51 that extends through the central hole of the first diaphragm member 50, so as to clamp the inner edge of the first diaphragm member 50 between the bourrelet 52 and a raised annular edge 62 of the second stem part 60. This clamping provides complementary gas-tightness should there be any problem with the circumferential weld 54.

Reference number 64 shows a second diaphragm member, which is axially spaced from the first diaphragm member 50 in the stem chamber 56. This second diaphragm member 64 is of the same type than the first diaphragm member 50.

A shaft 65 of the second stem part 60 extends through a central hole of the second diaphragm member 64. The inner edge of the second diaphragm member 64 lies on a shoulder of the second stem part 60. A circumferential weld 66 connects the second diaphragm member 64 to the second stem part 60 in a gasproof manner.

A first annular mounting 68 is located in the stem chamber 56 between the first and the second diaphragm members 50 and 64. It has a concave first surface facing the first diaphragm member 50 and a flat second surface facing the second diaphragm member 64. An annular outer border of the concave first surface bears against the outer edge of the first diaphragm member 50. The second diaphragm member 64 lies with its outer edge on the second surface.

A connection piece 70 projects from the annular mounting 68 through a lateral opening in the valve body 10. This connection piece 70 has a passage 72 therein, which debouches in the central bore of the mounting 68 in which the second stem part 60 is housed. The purpose of this connection piece 70 is, on the one hand, to lock the mounting 68 in rotation, and on the other hand, to be able to create a partial vacuum in the stem chamber between the first and second diaphragm member 50 and 64. Such a partial vacuum allows to check whether both diaphragm members 50 and 64 still adequately fulfil their sealing function. The connection piece 70 is closed by a sealing cap 74 during standard operation of the valve.

A second annular mounting 76 is located in the stem chamber 56 on the opposite side of the second diaphragm member 64. The second mounting 76 has a concave first surface facing the second diaphragm member 64, wherein an annular outer border of this first surface bears against the outer edge of the second diaphragm member 64, which lies on the first mounting 68.

A screw-cap 78 is screwed on an outside thread of the first transverse body 22. This screw-cap 78 presses the second annular mounting 76 firmly into the stem chamber 56, so as to clamp the outer edge of the second diaphragm member 64 between the first and second mounting 68 and 76 and to press the first mounting 68 with its annular outer border firmly on the outer edge of the first diaphragm member 50.

A third stem part 80 is fixed on the shaft 65 that extends through the central hole of the second diaphragm member 64, so as to clamp the inner edge of the second diaphragm member 64 between the shoulder of the second stem part 60 and a convex front face of the third stem part 80. This clamping provides complementary gas-tightness should there be any problem with the circumferential weld 66. A seal ring 82 seals the third stem part 80 in the central bore of the second annular mounting 76.

It will be appreciated that the described valve provides a very high safety against gas leakage on the side of the valve stem. If there is a failure of the first diaphragm member 50, gas leakage will take place through the annular interstice between the second stem part 60 and the first mounting 68. This leakage will however be stopped by the second diaphragm member 64, so that no gas will escape from the valve body. (It will be noted in this context, that a failure of the first diaphragm member 50 that leads to a gas leakage through the annular interstice between the first mounting 68 and the wall delimiting the stem chamber 56 is highly improbable.) Even if there is an additional failure of the second diaphragm member 64, greater amounts of gas could not escape from the stem chamber 56. In this case leakage will be stopped or substantially limited by the seal ring 82. Furthermore, as already stated above, the connection piece 74 allows to regularly check with a relatively high partial vacuum that both diaphragm members 50 and 64 still adequately fulfil their sealing function.

The third stem part 80 extends through the central hole of the screw cap 78 into a spring chamber 84 located in the screw cap 78. In this spring chamber 84 is housed a spring means, comprising preferably a stack of several flat springs 86, which bears on the screw-cap 78 to exert on the third stem part 80, via a disk 88 fixed to the latter, an elastic force that tends to pull the obturating body 38 onto its valve seat 40. The valve can consequently be operated as a normally closed valve. When the obturating body 38 sits on its valve seat 40, the total closing force acting on the obturating body 38 is due, on the one hand, to the gas cylinder pressure acting in the valve chamber 30 on the first diaphragm element 50, and on the other hand, to the elastic force produced by the springs 86. It follows that the springs 86 can be dimensioned smaller, while maintaining the same safety with regard to an unwanted gas discharge.

The third stem part has fixed thereon a tip 90 laterally projecting out of the valve body. As best seen on FIGS. 1 and 2, the tip 90 forms a bearing surface for a lever mechanism 92 operatively connecting the pneumatic cylinder 26 to the valve stem for pushing the latter into the stem chamber.56, so as to lift the obturating body 38 from its seat 40 and to thereby open the valve.

Referring now to FIG. 2, it will be noted that the pneumatic cylinder 26 housed in the second transverse body 20 is a single-acting cylinder, i.e. the cylinder is exclusively capable of producing a stroke in one direction, i.e. to open the valve, the return stroke will be produced by the springs 86. The cylinder includes two pistons 100 and 102 mounted on a common actuator or piston rod 104. The first piston 100 is mounted in a first cylinder chamber 106. The second piston 102 is mounted in a second cylinder chamber 108. A pneumatic fluid enters into the first chamber 106 via a pneumatic connection 109 and into the second chamber 108 via an annular passage 110. A handwheel 112 allows to manually produce a stroke in the same direction as the pneumatic fluid by exerting a pushing force on a free end 114 of the actuating rod 104. This handwheel 112 may also be used for blocking the valve in the open position.

The lever mechanism 92 includes a lever arm 120 connected by means of a first articulation 122 to a free end 124 of the actuating rod 104. An intermediate articulation 126 connects the lever arm to a support ring 128 screwed onto the screw cap 78. The lever arm has a free end 130 that bears on the tip 90 of the valve stem.

If the pneumatic cylinder is pressurised with the pneumatic fluid, the actuating rod 104 is urged in the direction of arrow 132 and pivots the lever arm 120 about the articulation 126 so as to push with its free end 130 the valve stem against the action of the above mentioned spring and pressure force into the valve body and to thereby open the valve. A mechanical endstop (not shown) determines the maximum possible stroke of the valve stem. If the pneumatic cylinder is depressurised the springs 86 urge the valve stem in the opposite direction. The tip 90 of the valve stem pivots the lever arm 120 about the articulation 126 so as to push the actuating rod 124 in the opposite direction of arrow 132 until the obturating body 38 sits again on its valve seat 40.

Referring to FIG. 1, it will be noted that the lever mechanism 92 is located outside of the valve body 10 laterally thereof. In order to protect the lever mechanism 92 against mechanical damages, a two-piece protection cap 140, 142 is provided, which can be removably mounted over the valve end where the lever mechanism 92 is located.

Referring again to FIG. 3, the outlet connection 22 and its sealing cap 24 will now be described in detail.

It will first be appreciated that the outlet connection 22 is removably fixed to the valve body. It is indeed the outlet connection that is the most subjected to the risk of corrosion. The separate outlet connection 22 can e.g. be made in a higher grad material than the rest of the valve body 10, without substantially increasing the price of the valve. Furthermore, the separate outlet connection 22 can be exchanged at relatively low costs if corrosion is detected. The outlet connection 22 is fixed to the valve body 10 with the help of a screw ring 150. The latter presses the removable outlet connection 22 with a planar sealing face firmly against a corresponding planar sealing face of the valve body 10. A metallic seal ring, preferably a C-ring 152, is located in a groove between the planar sealing faces and provides a gasproof connection. Pins 154 prevent the outlet connection 22 from rotating when the screw ring 150 is screwed on the valve body 10.

The sealing cap 24 is a special construction that is particularly suited for use with the above described valve. It has integrated therein a locking device for locking the valve in the closed position during transport. This locking device includes a push bolt 156 extending into the outlet passage 34 in the outlet connection 22 for pushing the obturating body 38 firmly against its seat 40. A spring 158 associated with the push bolt 156 for limiting the pushing force exerted on the obturating body 38 when the sealing cap 24 is screwed on the outlet connection 22. A seal ring 160 seals the push bolt 156 in the outlet passage 34, so as to even further decrease the risk of gas leakage.

It will be appreciated that the above described sealing cap 24 is an important safety feature of the valve. It prevents for example that the obturating body 38 can lift-off from its seat 40, when the gas cylinder is subjected to vibrations during transport. Thus no toxic gas may accumulated in the outlet connection 22 under the sealing cap 24, which would be freed when the sealing cap is removed. It also prevents the valve from being manually opened as long as the sealing cap 24 is screwed on the outlet connection 22.

What is claimed is:

1. A gas cylinder valve with an outlet connection comprising:
    a valve body having a valve chamber, an inlet passage and an outlet passage, said inlet passage and said outlet passage communicating with said valve chamber, and said outlet passage extending through said outlet connection;
    a valve seat located between said valve chamber and said outlet passage in axial alignment with said outlet passage;
    an obturating body associated with and movable relative to said valve seat in axial alignment with said outlet passage;
    a valve stem connected to said obturating body for moving the latter between a closed position, wherein said obturating body sits on said valve seat so as to seal gas discharge through said valve seat, and an open position, wherein said obturating body is spaced from said valve seat so as to allow gas discharge from a gas cylinder through said valve seat, said valve chamber being under gas cylinder pressure when said obturating body sits on said valve seat;
    a first diaphragm member forming a flexible wall of said valve chamber,
    wherein said first diaphragm member is mechanically connected via said valve stem to said obturating body, so that gas pressure acting in said valve chamber onto said first diaphragm member when said valve is closed pulls said obturating body via said valve stem onto said valve seat by elastically deforming said first diaphragm member;
    a sealing cap to be put onto said outlet connection; and a locking device integrated in said sealing cap for pushing said obturating body firmly against its seat, when said sealing cap is put onto said outlet connection.

2. The valve as claimed in claim 1, wherein:

said first diaphragm member seals off a first cross-section in said valve chamber;

said obturating body sitting on said valve seat seals off a second cross-section in said valve chamber; and said first cross-section is bigger than said second cross-section.

3. The valve as claimed in claim 1, further comprising spring means associated with said stem so that it biases said obturating body on said valve seat.

4. The valve as claimed in claim 1, wherein:

said stem extends axially through said first diaphragm member; and a gas tight weld connects said stem to said first diaphragm member.

5. The valve as claimed in claim 4, wherein:

said valve body has a stem chamber with a shoulder therein; and said first diaphragm member has an outer edge lying on said shoulder.

6. The valve as claimed in claim 5, wherein a gas tight weld connects said outer edge to said shoulder.

7. The valve as claimed in claim 6, further comprising a second diaphragm member axially spaced from said first diaphragm member in said stem chamber.

8. The valve as claimed in claim 7, further comprising a channel in said valve body for creating a partial vacuum in said stem chamber between said first diaphragm member and said second diaphragm member.

9. The valve as claimed in claim 1 wherein:

said stem extends axially in a gas tight manner through said first diaphragm member;

said valve body has a stem chamber with a shoulder therein; and said first diaphragm member has an outer edge lying on said shoulder;

said valve further comprises:

a second diaphragm member axially spaced from said first diaphragm member in said stem chamber;

a first annular mounting located in said stem chamber between said first and said second diaphragm members, said first annular mounting having a first surface facing said first diaphragm member, and a second surface facing said second diaphragm member, wherein an annular outer border of said first surface bears against said outer edge of said first diaphragm member, and said second diaphragm member lies with its outer edge on said second surface;

a second annular mounting located in said stem chamber on the opposite side of said second diaphragm member, said second mounting having a concave first surface facing said second diaphragm member, wherein an annular outer border of said first surface bears against said outer edge of said second diaphragm member; and means for pressing said second annular mounting firmly into said stem chamber, so as to clamp said second diaphragm member between said first and second mountings and to press said first mounting with its annular outer border firmly on said outer edge of said first diaphragm member.

10. The valve as claimed in claim 1, wherein said locking device includes:

a push bolt for pushing said obturating body firmly against its seat;

a spring associated with said push bolt for limiting the pushing force exerted on said obturating body.

11. The valve as claimed claim 1, wherein:

said outlet connection is removably fixed to said valve body.

12. The valve as claimed in claim 11, further comprising:

a screw ring for pressing said removable outlet connection with a planar sealing face firmly against a corresponding planar sealing face of said valve body.

13. The valve as claimed in claim 12, further comprising:

a metallic seal ring means located between said planar sealing faces.

14. The valve as claimed in claim 1, further comprising:

a linear actuator mounted on said valve body; and a lever mechanism operatively connecting said linear actuator to said valve stem for moving said obturating body from said closed position into said open position.

15. The valve as claimed in claim 14, wherein said lever mechanism is located outside of said valve body and laterally thereof.

16. The valve as claimed in claim 15, further comprising a cap removably mounted on said valve body for protecting said lever mechanism.

17. The valve as claimed in claim 15, wherein:

said actuator includes an actuating rod;

said lever mechanism includes a lever arm connected by means of an articulation to said actuating rod, and an intermediate articulation for said lever arm on said valve body;

said valve stem has a tip projecting out of said valve body; and said lever arm has a free end bearing against a bearing surface on said tip, so as to be able to push said valve stem into said valve body.

18. The valve as claimed in claim 14, wherein said linear actuator is a pneumatic cylinder.

19. The valve as claimed in claim 14, wherein said actuator includes a manual actuating device for manually pushing said valve stem into said valve body.

20. The valve as claimed in claim 1, wherein said valve body includes:

a flange for mounting said valve on a gas cylinder;

a relatively thin neck having most of said inlet passage therein; and a first transverse body supported by said relatively thin neck, said first transverse body housing said valve chamber, said seat, said outlet passage, said obturating body, said valve stem and said first diaphragm member; wherein the axis of motion of said stem is transverse to said relatively thin neck.

21. The valve as claimed in claim 20, wherein said valve body further includes:

a second transverse body supported on said first transverse body, said second transverse body housing a linear actuator, wherein the axis of motion of said linear actuator is transverse to said relatively thin neck.

22. The valve as claimed in claim 1, wherein said valve seat and said obturating body are in axial alignment with said outlet passage.

23. A gas cylinder valve comprising:
- a valve body having a valve chamber, a stem chamber with a shoulder therein, an inlet passage and an outlet passage, said inlet passage and said outlet passage communicating with said valve chamber;
- a valve seat located between said valve chamber and said outlet passage;
- an obturating body associated with and movable relative to said valve seat;
- a valve stem connected to said obturating body for moving the latter between a closed position, wherein said obturating body sits on said valve seat so as to seal gas discharge through said valve seat, and an open position, wherein said obturating body is spaced from said valve seat so as to allow gas discharge from the gas cylinder through said valve seat, said valve chamber being under gas cylinder pressure when said obturating body sits on said valve seat;
- a first diaphragm member having an outer edge lying on said shoulder in said stem chamber and forming a flexible wall between said valve chamber and said stem chamber; wherein said first diaphragm member is mechanically connected via said valve stem to said obturating body, so that gas pressure acting in said valve chamber onto said first diaphragm member when said valve is closed pulls said obturating body via said valve stem onto said valve seat by elastically deforming said first diaphragm member;
- a second diaphragm member axially spaced from said first diaphragm member in said stem chamber;
- a first annular mounting located in said stem chamber between said first and said second diaphragm members, said first annular mounting having a first surface facing said first diaphragm member, and a second surface facing said second diaphragm member, wherein an annular outer border of said first surface bears against said outer edge of said first diaphragm member, and said second diaphragm member lies with its outer edge on said second surface;
- a second annular mounting located in said stem chamber on the opposite side of said second diaphragm member, said second mounting having a concave first surface facing said second diaphragm member, wherein an annular outer border of said first surface bears against said outer edge of said second diaphragm member; and
- means for pressing said second annular mounting firmly into said stem chamber, so as to clamp said second diaphragm members between said first and second mounting and to press said first mounting with its annular outer border firmly on said outer edge of said first diaphragm member.

24. A gas cylinder valve comprising:
- a valve body having a valve chamber, a stem chamber, an inlet passage and an outlet passage, said inlet passage and said outlet passage communicating with said valve chamber;
- a valve seat located between said valve chamber and said outlet passage;
- an obturating body associated with and movable relative to said valve seat;
- a valve stem connected to said obturating body for moving the latter between a closed position, wherein said obturating body sits on said valve seat so as to seal gas discharge through said valve seat, and an open position, wherein said obturating body is spaced from said valve seat so as to allow gas discharge from the gas cylinder through said valve seat, said valve chamber being under gas cylinder pressure when said obturating body sits on said valve seat;
- a first diaphragm member forming a flexible wall of said valve chamber, wherein said first diaphragm member is mechanically connected via said valve stem to said obturating body, so that gas pressure acting in said valve chamber onto said first diaphragm member when said valve is closed pulls said obturating body via said valve stem onto said valve seat by elastically deforming said first diaphragm member;
- a second diaphragm member axially spaced from said first diaphragm member in said stem chamber; and
- a channel in said valve body for creating a partial vacuum in said stem chamber between said first diaphragm member and said second diaphragm member.

* * * * *